June 4, 1940.   C. G. JONES ET AL   2,202,914
METHOD AND APPARATUS FOR REMOVING BURRS
Filed June 28, 1938   3 Sheets-Sheet 1
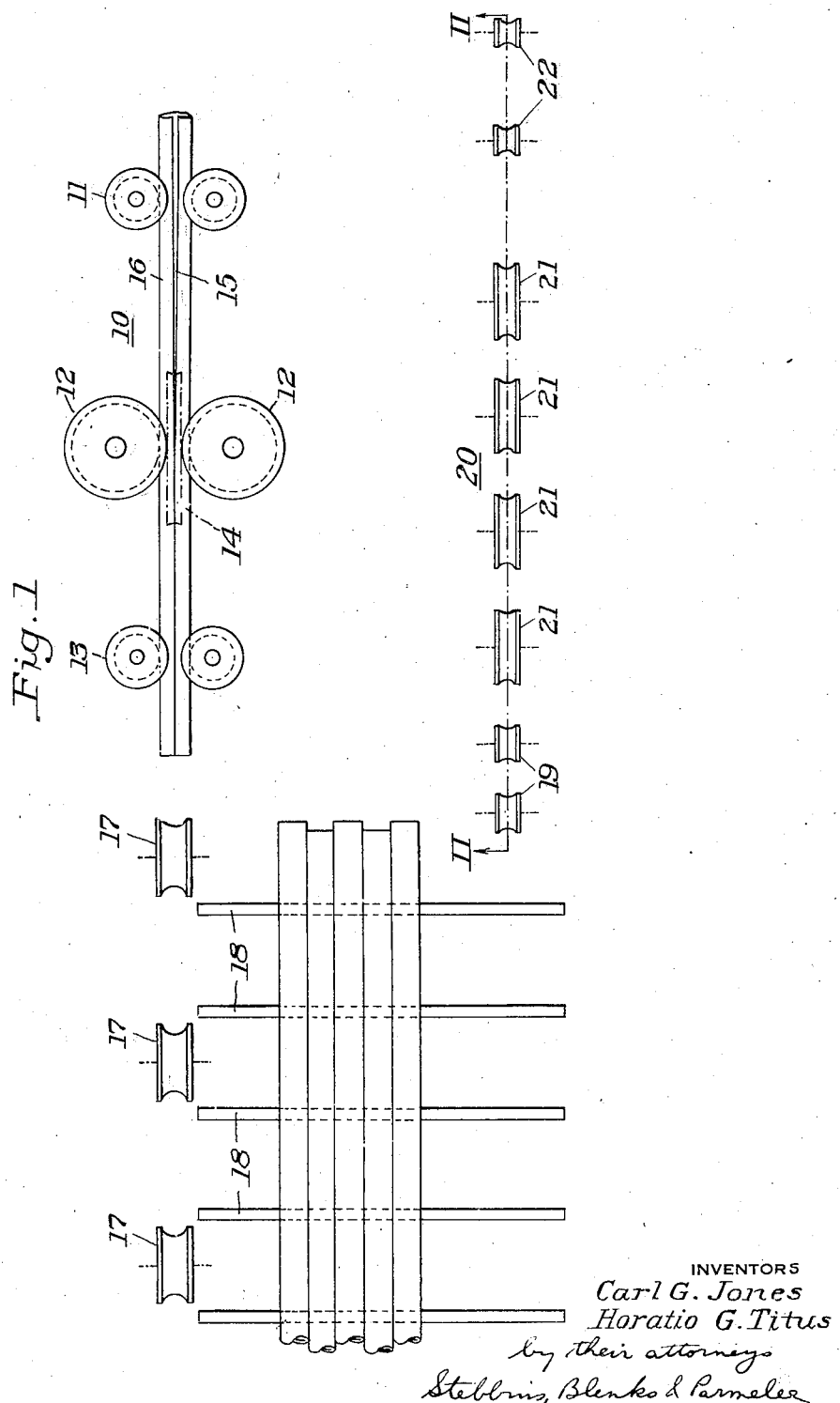
INVENTORS
Carl G. Jones
Horatio G. Titus
by their attorneys
Stebbins, Blenko & Parmelee June 4, 1940.   C. G. JONES ET AL   2,202,914
METHOD AND APPARATUS FOR REMOVING BURRS
Filed June 28, 1938   3 Sheets-Sheet 2
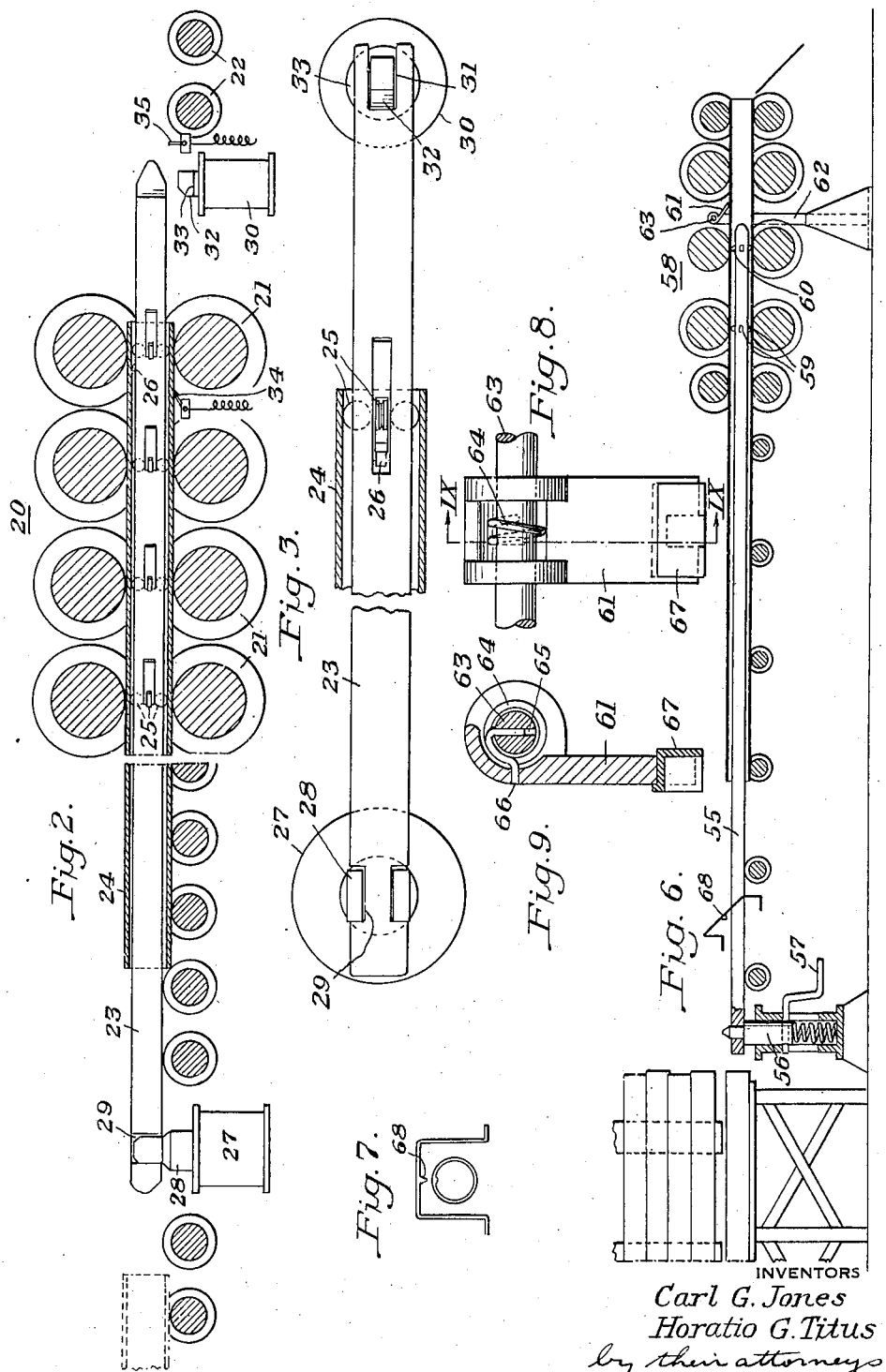
INVENTORS
Carl G. Jones
Horatio G. Titus
by their attorneys
Stebbins, Blenko & Parmelee June 4, 1940.   C. G. JONES ET AL   2,202,914
METHOD AND APPARATUS FOR REMOVING BURRS
Filed June 28, 1938   3 Sheets-Sheet 3
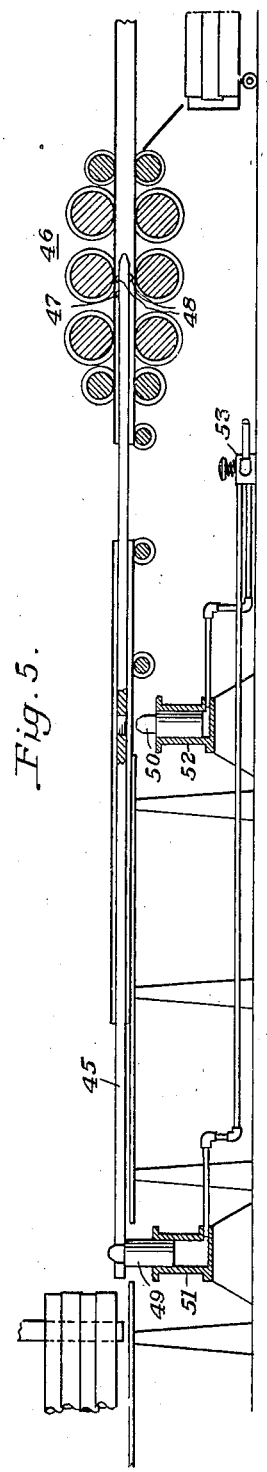
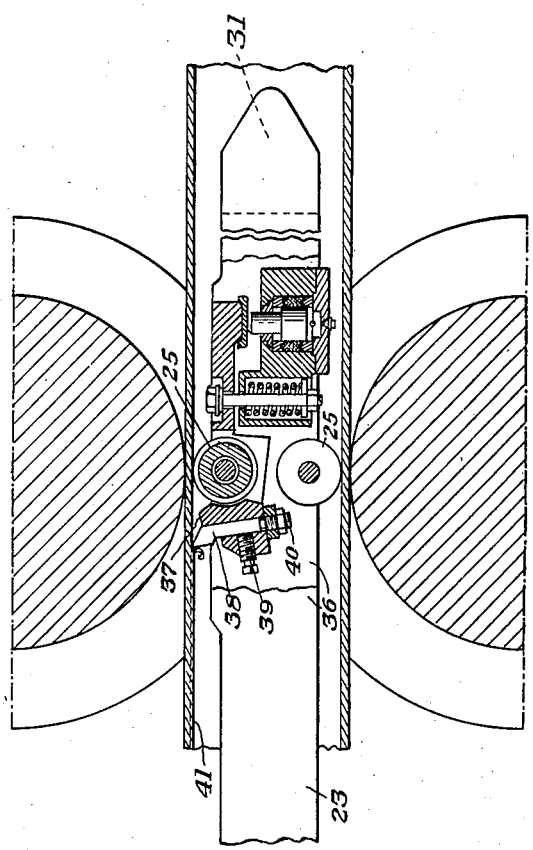
INVENTORS
Carl G. Jones
Horatio G. Titus
by their attorneys
Stebbins, Blenko & Parmelee Patented June 4, 1940

2,202,914

UNITED STATES PATENT OFFICE 2,202,914

METHOD AND APPARATUS FOR REMOVING BURRS

Carl G. Jones and Horatio G. Titus, Youngstown, Ohio, assignors to The Youngstown Sheet and Tube Company, a corporation of Ohio Application June 28, 1938, Serial No. 216,384

13 Claims. (Cl. 90—24)

This invention relates to the manufacture of welded pipe or tubes and, particularly, to the removal of the inside burr from the welded seam extending longitudinally of the pipe.

The general practice in making welded pipe has been to cut off or roll down the inside burr progressively just after the completion of the weld. Ordinarily the inside burr removing means is carried on a mandrel secured to a fixed support on the entering side of the welder by a plate extending laterally through the open seam cleft, the free end of the mandrel extending beyond the welding throat and provided with burr removing means spaced from the throat by only a short distance. Numerous objections to this practice have been encountered in actual operations. In the first place, working on the inside burr while hot immediately after it leaves the welder creates a tendency to open up the hot seam and to introduce stress into the seam by the removal of hot metal therefrom. In the second place, if the burr is not fully removed, it is impossible to cure the defect and the pipe must be scrapped as it cannot be passed through the welder a second time. It will be recognized that the removal of the inside burr must in all cases be carried on without any opportunity for the operator to examine the progress of the work. This means that in setting up the welding plant for different sizes, the production of a certain amount of scrap pipe is almost inevitable under the present practice, until the necessary adjustments have been made.

Further objections to removal of the burr contemporaneously with the welding of the seam include the fact that the pipe is subjected to a certain amount of mechanical movement, vibration or the like by the burr removing operation and this may cause poor contact at the welding electrode. A further objection is the high cost of the special alloy steel which must be employed to operate on highly heated metal.

We have invented a novel method and apparatus for removing burrs from the seams of welded pipe and tubes which avoid the aforementioned objections and are characterized by further features of novelty and advantage which will be explained more fully hereinafter. In a preferred practice of our invention, we do not attempt to remove the burr while the welding is going on but permit the welded seam to cool and then effect burr removal as a separate step in the finishing operation. We prefer to remove the burr during the sizing of the welded pipe and have illustrated herein apparatus therefor which is incorporated in a series of sizing stands. The apparatus includes a mandrel over which the pipe is adapted to pass. The mandrel is provided with burr removing means and also with means for holding the mandrel against longitudinal movement under the thrust exerted thereon by the burr removing operation. The invention contemplates the removal of the burr by rolling it down or by cutting it off with suitable tools and the term "burr removing means" as used in the following detailed description and claims is intended to include both rolls and cutting tools. The invention will be described with reference to the accompanying drawings illustrating a typical embodiment and practice, with certain modifications. In the drawings:

Fig. 1 is a schematic diagram showing in plan the apparatus employed, with certain omissions, and indicating the general sequence of operations;

Fig. 2 is a diagrammatic sectional view taken along the line II—II of Fig. 1 and including certain elements omitted from the latter;

Fig. 3 is a plan view to enlarged scale of the mandrel, showing a portion of a pipe length in section;

Fig. 4 shows a portion of Fig. 5 to enlarged scale;

Fig. 5 is a view similar to Fig. 1 showing a modification partially in elevation and partially in section;

Fig. 6 is a view similar to Fig. 2 showing a further modification;

Fig. 7 is a partial end elevation showing a detail;

Fig. 8 is a partial end elevation showing another detail; and

Fig. 9 is a sectional view along the line IX—IX of Fig. 8.

Referring now in detail to the drawings and, for the moment, to Fig. 1, a pipe welding apparatus is indicated generally at 10 including stands of feed-in rolls 11, side pressure rolls 12 and feed-out rolls 13. A rotary disk electrode 14 cooperates with the side pressure rolls to define a welding throat. The electrode causes current to flow across the cleft 15 between the edges of the pipe length 16 formed from flat skelp by bending it into a cylinder. The side pressure rolls effect the welding of the seam edges in the known manner by pressing them together when they have been raised to welding temperature by passage of current from the electrode across the seam.

When the longitudinal seam between the abutting edges has been completely welded forming a pipe, the latter is discharged onto any suitable conveying means such as a roller table 17. The pipe is then moved onto transfer means of any convenient form such as skid bars 18 forming a cooling and transfer bed. The longitudinal seams of the welded pipe are cooled substantially to room temperature in passing over the skids 18 and the pipe is then delivered by conveying means such as rollers 19 to a sizing mill 20 comprising a plurality of roll stands 21. As before stated, the sizing mill incorporates our preferred form of burr removing means which will next be described in detail. As the pipe lengths emerge successively from the sizing mill, they are delivered by any suitable means such as rollers 22 to the next apparatus in the series for performing the usual finishing operations such as threading enameling, etc.

Referring now more particularly to Figs. 2 and 3, it will be seen that a mandrel 23 over which a welded pipe indicated at 24 is adapted to pass, cooperates with the rolls of the stands 21. The mandrel is preferably provided with guide rolls 25 adapted to engage the interior of the pipe and with burr removing means 26 illustrated in greater detail in Fig. 4. The guide rolls 25 which engage the pipe adjacent the seam should be grooved so they straddle the burr thrown up during the welding operation.

A retractable anchorage is provided adjacent the entering end of the mandrel 23 comprising a cylinder 27 having a piston reciprocable therein carrying a bifurcated head 28. The latter is adapted to cooperate with recesses 29 formed in the sides of the mandrel as best shown in Fig. 3 to restrain the mandrel against longitudinal movement. The head 28 is caused to move up or down by the application of fluid under pressure to opposite ends of the cylinder 27 as desired.

A similar anchorage 30 is provided for the exit end of the mandrel which is bifurcated as at 31 to receive the end of a reciprocable head 32 which is shouldered as at 33.

The operation of the heads 28 and 32 may be controlled manually, or automatically in accordance with the movement of the pipe over the mandrel. Flag switches 34 and 35 are so positioned as to be actuated by the successively advancing pipe lengths and are utilized to control electromagnetic valves admitting fluid under pressure to opposite ends of the cylinders 27 and 30.

It will be readily understood that the head 28 must be retracted and the head 32 advanced to permit a pipe to be moved onto the mandrel. Before the pipe enters the first sizing stand, the mandrel is supported on the bottom rolls of the several stands 21 by the guide rolls 25. The flag switch 34 is so positioned that it will be operated by the time the trailing end of a pipe has cleared the anchorage 27. Actuation of the flag switch causes the head 28 to be advanced and the head 32 to be retracted. The pipe is then free to move off the mandrel as the sizing operation and burr removal are simultaneously effected. It will be understood that the pipe is positioned with its welded seam in alinement with the burr removing means before being started onto the mandrel 23. As the pipe passes off of the mandrel 23 it closes flag switch 35. This energizes a time delay relay effective to cause advancement of the head 32 after the trailing end of the pipe has passed beyond it and retraction of the head 28, whereupon the entire cycle may be repeated.

Referring now to Fig. 4, the mandrel 23 may conveniently be provided with spaced side walls 36 adjacent its exit end. A tool holder 37 is mounted between the side walls and is provided with a cutting tool 38 secured therein by a screw 39, and provided with an adjusting screw 40. Instead of the cutting tool 38, a burr flattening roll may be mounted on the mandrel instead of the upper grooved guide roll 25, for rolling down the burr indicated at 41.

Fig. 5 illustrates a modification of the apparatus shown in Figs. 2 and 3. In Fig. 5, a mandrel 45 cooperates with a sizing mill 46 and is provided with burr removing means 47 and guide rolls 48. Retractable heads 49 and 50 are reciprocable in cylinders 51 and 52. A valve 53, which may conveniently be of the pedal type, controls the application of fluid under pressure to the cylinders. When it is desired to start a pipe length onto the mandrel 45, the valve 53 is actuated to cause retraction of the head 49 and advancement of the head 50. It will be understood that the valve 53 when actuated connects the cylinder 51 to the exhaust, permitting the head 49 to fall by its own weight. The head 50 thus holds the mandrel 45 during the starting of a pipe length onto the mandrel. When the pipe length has been advanced to an intermediate position between the heads 49 and 50, the valve 53 is released to restore the heads to the positions shown in Fig. 5. The pipe length which has been started is then free to advance toward the sizing mill. When it has started into the latter and its trailing end has cleared the head 50, the valve 53 may then be operated again to start a tube along the mandrel. The procedure just described is repeated and successive pipe lengths are thus advanced rapidly along the mandrel, through the sizing mill and past the burr removing means.

In a further modification of the invention shown in Figs. 6 through 9, a mandrel 55 is held against longitudinal movement during the burr removing operation by a retractible head 56 which may conveniently be actuated by a pedal 57. The mandrel 55 cooperates with a sizing mill 58 and is provided with guide rolls 59 and burr removing means 60. A spring urged lever 61 pivoted on a support 62 yieldably holds the mandrel 55 against displacement, by engaging its exit end when the head 56 is retracted for the entry of a pipe length. As shown in Figs. 8 and 9, the lever 61 is rotatable on a shaft 63 fixed to the support 62. A coil spring 64 is wrapped around the shaft 63, one end being inserted in a diametrical hole 65 through the shaft, the other being inserted through a hole in the lever as shown at 66. The spring 64 urges the lever 61 in a clockwise direction as viewed in Fig. 6. An insert 67 of non-metallic material prevents scratching of the pipe by the lever as the pipe advances through the sizing mill thereby displacing the lever 61 from its normal position. Figs. 6 and 7 also illustrate an index member 68 to guide the operator in so positioning the welded seam before starting the pipe onto the mandrel that accurate engagement of the burr by the removing means 60 is assured to effect complete removal of the burr.

It will be understood that the invention is characterized by numerous advantages over the methods and apparatus used heretofore for removing burrs. By performing the burr removing operation only after the welded seam has cooled, we avoid all possibility of opening the seam. We also eliminate the effect of any chattering or vibration which might be created during the burr removing operation, upon the contact pressure exerted by the electrode on the blank during welding. The use of expensive alloys for burr removing means is not necessary as the latter does not have to operate at high temperature. A further advantage is that if the burr is not fully removed from a pipe length on the first pass it can be subjected to a second pass over the mandrel and through the sizing mill. It is thus possible to reclaim pipe lengths which under the previous practice had to be scrapped.

While the invention has been described with particular reference to the removal of inside burrs, it may also be applied to the removal of outside burrs with the same advantages.

While we have illustrated and described but a preferred embodiment and practice of the invention with certain modifications, it will be understood that changes in the construction and procedure disclosed may be made without departing from the spirit of the invention or the scope of the appended claims.

We claim:

1. Apparatus for removing burrs from the seams of welded tubes comprising in combination a mandrel over which the tubes are adapted to pass, burr-removing means on said mandrel, and means at points spaced along said mandrel movable into and out of engagement therewith and effective to withstand the thrust exerted on the mandrel by the movement of a tube thereover.

2. Apparatus for removing burrs from the seams of welded tubes comprising in combination a mandrel over which the tubes are adapted to pass, burr-removing means on said mandrel, and means adjacent the entering and exit ends of the mandrel movable into and out of engagement therewith and effective to withstand the thrust exerted on the mandrel by the movement of a tube thereover.

3. Apparatus for removing burrs from the seams of welded tubes comprising in combination a stand of sizing rolls, a mandrel extending through the pass defined by said rolls, burr-removing means on said mandrel, and means at points spaced along said mandrel movable into and out of engagement therewith and effective to withstand the thrust exerted on the mandrel by the movement of a tube thereover.

4. Apparatus for removing the burr from the seams of welded tubes comprising a mandrel over which the tubes are adapted to pass, burr-removing means on said mandrel, separate means spaced from the entering end of said mandrel and adjacent said end, respectively, for initially and finally holding said mandrel during the passage of a tube thereover, and common control means for simultaneously rendering one of said holding means effective and the other ineffective.

5. Apparatus for removing the burr from the seams of welded tubes comprising means adapted to engage said mandrel adjacent the entering end thereof for holding it against the thrust exerted thereon by a tube moving over said burr-removing means, and yieldable means displaceable by a tube moving off of the mandrel, effective to hold the mandrel as a tube is entered thereon when said first-mentioned means is ineffective.

6. Apparatus for removing the burr from the seams of welded tubes comprising retractable means adapted to engage said mandrel adjacent the entering end thereof, and yieldable means adapted to engage the mandrel at a point spaced from the entering end thereof for holding the mandrel while a tube is being started thereon, said yieldable means being displaceable by a tube moving off of said mandrel.

7. Apparatus for removing the burr from the seams of welded tubes comprising retractable means adapted to engage said mandrel adjacent the entering end thereof, a spring urged lever adapted to engage the mandrel at a point spaced from the entering end thereof for holding the mandrel while a tube is being started thereon, said lever being displaceable by a tube moving off of the said mandrel.

8. Apparatus for removing burrs from the seams of welded tubes comprising in combination a mandrel over which the tubes are adapted to pass, burr-removing means on said mandrel, and means at points spaced along said mandrel movable into and out of engagement therewith and effective to withstand the thrust exerted on the mandrel by the movement of a tube thereover and means actuated by the passage of a tube over said mandrel for controlling the movement of said means.

9. In a method of removing the burr from the seam of a welded tube, the steps including so positioning the tube that the burr is disposed at a predetermined location, passing the tube over a mandrel initially restraining the mandrel by its exit end, finally restraining the mandrel by its entering end, and removing the burr as the tube passes over the mandrel.

10. In a method of removing the burr from the seam of a welded tube, the steps including so positioning the tube that the burr is disposed at a predetermined location, passing the tube over a mandrel, initially restraining the mandrel by its exit end, finally restraining the mandrel by its entering end and removing the burr from the tube while subjecting the tube to a sizing operation.

11. In a method of removing the burr from the seam of a welded tube, the steps including so positioning the tube that the burr is disposed at a predetermined location, passing the tube over a mandrel, initially restraining the mandrel by engaging it at a point spaced along the path of travel of the tube from the entering end of the mandrel, finally restraining the mandrel by engaging it at a point adjacent its entering end, and removing the burr from the tube while it passes over the mandrel.

12. In a method of removing the burr from the seam of a welded tube, the steps including so positioning the tube that the burr is disposed in a predetermined location, passing the tube over a mandrel, initially restraining the mandrel by engaging it at a point intermediate the ends thereof, and while so restraining it, starting a tube onto the entering end, removing a previously started tube from the exit end and simultaneously removing the burr therefrom, and finally restraining the mandrel adjacent its entering end while moving a tube thereon from a position adjacent the entering end toward the exit end.

13. In a method of removing burrs from welded tubes, the steps including so positioning the tube that the burr is disposed in a predetermined location, moving the tube into a preliminary position on the entering end of a mandrel while restraining the mandrel by engaging it at a point spaced therealong from its entering end, then restraining the mandrel by engaging it adjacent its entering end, and after releasing the mandrel at said first-mentioned point, moving said tube along said mandrel to a working position, then re-engaging said mandrel adjacent said first-mentioned point, starting a second tube onto the mandrel and moving the first tube off of the exit end of the mandrel and simultaneously removing the burr therefrom.

CARL G. JONES.
      HORATIO G. TITUS.